Sept. 24, 1929.   D. C. BAKER   1,729,093
BLOWER
Filed Oct. 21, 1926
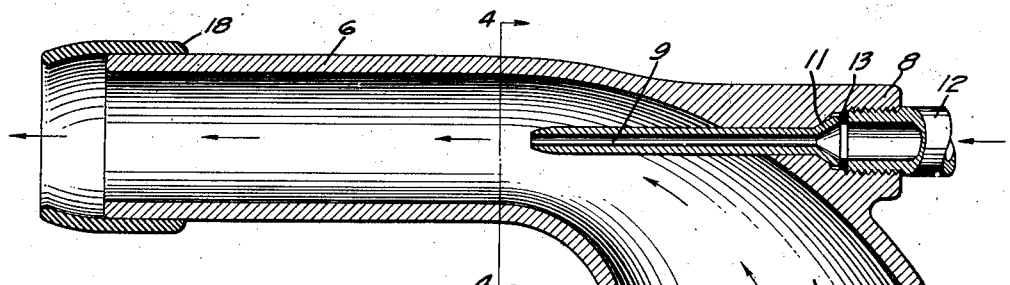
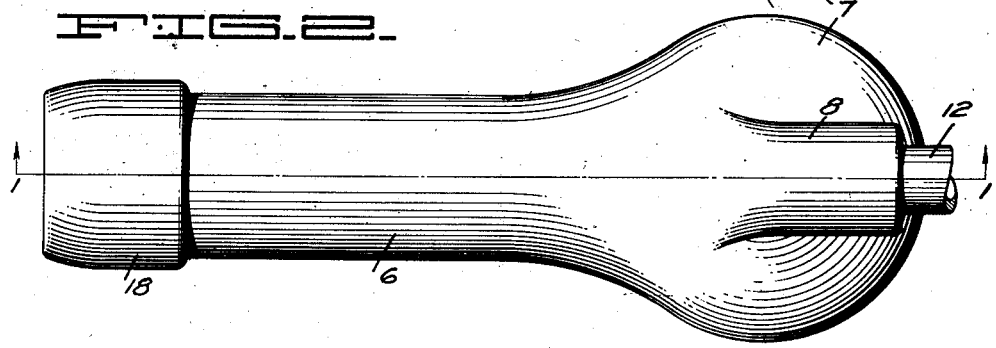
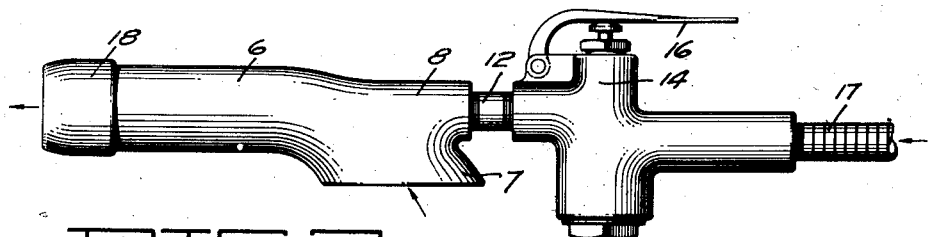
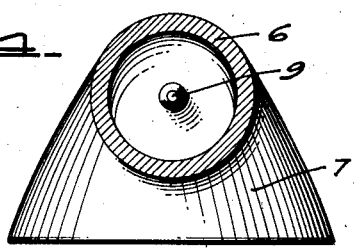
INVENTOR
BY Dexter C. Baker
White Prost
ATTORNEYS Patented Sept. 24, 1929

1,729,093

UNITED STATES PATENT OFFICE

DEXTER C. BAKER, OF OAKLAND, CALIFORNIA, ASSIGNOR TO BAKER-HANSEN MANUFACTURING CO., OF ALAMEDA, CALIFORNIA, A CORPORATION OF CALIFORNIA

BLOWER

Application filed October 21, 1926. Serial No. 143,138.

It has become the custom in garages to dry automobiles, after they have been washed, by means of a blast of compressed air. The air used for this purpose is the compressed air ordinarily available in a garage and which is furnished for operating pneumatic machinery and for inflating tires. The pressure of the air is usually in the neighborhood of 150 pounds per square inch. When used to dry a car, the air is discharged by means of a nozzle against the previously washed automobile and blows part of the water off and removes the remainder by evaporation. This method of drying, although effective, is wasteful of air as a large amount of air under high pressure is used. It is also liable to be injurious to the finish of the vehicle as the corresponding high velocity of the jet of high pressure air tends to drive small particles of gritty matter such as sand and dirt into the finish of the car. Special blowers are sometimes installed for furnishing drying air, but they are an expense in addition to the usual garage equipment, not only for initial cost but for upkeep. The air they deliver tends to be warmed by the compression. It is considered that warm air is not advantageous for use against highly finished, varnished surfaces often encountered.
It is therefore an object of my invention to provide a blower which will utilize the compressed air equipment already existing in a garage for furnishing air suitable for use in drying vehicles.
Another object of my invention is to provide a blower which is inexpensive in first cost and requires practically no maintenance.

A further object of my invention is to provide a blower which will furnish cool air for drying purposes.

An additional object of my invention is to provide a blower which will utilize but a small amount of highly compressed air to furnish a large volume of air suitable for vehicle drying.

My invention possesses other advantageous features, some of which with the foregoing will be set forth at length in the following description where I shall outline in full that form of the blower of my invention, which I have selected for illustration in the drawings accompanying and forming part of the present specification. In said drawings I have shown one form of blower embodying my invention, but it is to be understood that I do not limit myself to such form since the invention, as set forth in the claim, may be embodied in a plurality of forms.

In the drawings:

Fig. 1 is a cross section of the blower of my invention the plane of section being indicated by the line 1—1 of Fig. 2.

Fig. 2 is a plan view of the blower shown in Fig. 1.

Fig. 3 shows in side elevation the blower of my invention attached to a suitable controlling cock and air line and indicates the blower in position for use.

Fig. 4 is a transverse section of the blower of my invention the plane of section being indicated by the line 4—4 of Fig. 1.

The blower of my invention preferably comprises a tube in which a comparatively small amount of highly compressed air can expand and which is provided with an opening thru which a comparatively large quantity of air can be inducted and subsequently be discharged from the tube along with the expanded air.

One form of the blower is especially adapted for use in drying vehicles and includes an integral body preferably of cast material, such as aluminum, and includes an induction tube 6 of generally cylindrical contour which merges smoothly with an intake horn 7 of gradually increasing cross section. The intake horn is suitably curved and flared to afford a wide opening to the atmosphere well to one side of the induction tube. Mounted on the intake horn and arranged substantially co-axially with the cylindrical induction tube 6 is a boss 8. The boss is preferably cast integrally with the tube and horn and is bored out centrally to receive a nozzle 9 which is disposed co-axially with the induction tube 6. The nozzle 9 is preferably made of brass or other material having a lesser coefficient of expansion than the boss 8. The end of the tube 9 is flared and rests within a conical seat 11 formed on the interior of the boss 8. The nozzle 9 is held in place by means of a nipple 12 screwed into the boss 8 and bearing against an interposed gasket 13. The nipple 12 connects thru a cock 14, manually operable by a handle 16, with a preferably flexible pipe 17 leading to a source of air under pressure. The source of air under pressure, not shown, to which the flexible pipe 17 connects is such as is usually found in garages and normally contains air under pressure of approximately 150 pounds per square inch. To prevent careless manipulation of the blower from marring the highly finished surfaces at which the air stream is directed, an annulus or ring 18 preferably of rubber or other cushioning material is slipped over the end of the induction tube 6 and prevents direct contact of the induction tube with the surface being dried.

In the operation of my blower, the induction tube 6 is directed at the surface to be dried and the handle 16 is depressed operating the cock 14 and permitting a supply of highly compressed air to flow from the source of air under pressure thru the flexible pipe 17 and thru the nipple 12 into the nozzle 9. The compressed air flows thru the nozzle 9 and discharges and expands substantially along the central axis of the cylindrical induction tube 6. A large quantity of air is induced to flow thru the intake horn 7 and the induction tube 6 and discharge with the expanded air. The air expanding from the nozzle 9 drops somewhat in temperature, and since the material of the boss 8 is of a greater coefficient of expansion than the material of the nozzle 9, the boss tends to contract at a greater rate than the nozzle and holds the nozzle firmly in place. Also, the air induced to flow in thru the intake horn 7 and mingle with the expanded compressed air is slightly cooled and is discharged from the induction tube 6 at a temperature which will not injure the varnish or other finish on the vehicle being dried.

The foregoing description treats of my blower as it is used in a particular environment but the device, either in the form shown in the drawings or in modified forms is applicable to various other uses. It will furnish a large quantity of rapidly moving air using but a small amount of high pressure air. A small compressor and small high-pressure piping can be used in place of a large blower and large size pipe leading from the blower to the point of use, thereby effecting a considerable saving in the cost of the conduits and transmitting a lesser volume of air. The high pressure air discharging from the nozzle induces the flow of a great quantity of air at a relatively high speed, making the device very advantageous for all purposes where the blowing of a large volume of air is desirable.

I claim:

A portable blower comprising a cylindrical open ended casting adapted to be held in the hand provided at its opposite end with an outwardly flaring substantially 30° elbow, said elbow having an apertured boss in line with the axis of the casting and a nozzle in said aperture and extending along the axis of the casting to the inner boundary of the flared elbow.

In testimony whereof, I have hereunto set my hand.

DEXTER C. BAKER.